United States Patent
Streciwilk

(10) Patent No.: US 7,357,823 B1
(45) Date of Patent: Apr. 15, 2008

(54) DISPOSABLE FILTER WITHIN A REMOVABLE CHAMBER

(75) Inventor: Eric J. Streciwilk, Perryville, KY (US)

(73) Assignee: Panasonic Corporation of North America, Secaucus, NJ (US)

( * ) Notice: Subject to any disclaimer, the term of this patent is extended or adjusted under 35 U.S.C. 154(b) by 575 days.

(21) Appl. No.: 10/702,141

(22) Filed: Nov. 5, 2003

Related U.S. Application Data

(60) Provisional application No. 60/424,424, filed on Nov. 7, 2002.

(51) Int. Cl.
*B01D 41/00* (2006.01)

(52) U.S. Cl. .................... 55/337; 55/413; 55/426; 55/459.1; 55/482; 55/486; 55/487; 55/496; 55/501; 55/505; 55/510; 55/521; 55/529; 55/DIG. 3; 15/353; 15/347; 15/352

(58) Field of Classification Search ............ 55/334, 55/337, 414, 467, 482, 486, 489, DIG. 3, 55/521, 529, 413, 426, 459.1, 487, 498, 501, 55/505, 510; 15/348, 353, 347, 352; 96/134, 96/382

See application file for complete search history.

(56) References Cited

U.S. PATENT DOCUMENTS

| | | | | |
|---|---|---|---|---|
| 2,219,567 A | * | 10/1940 | Spielman | ............... 55/372 |
| 2,295,984 A | * | 9/1942 | Wilson | ............... 55/288 |
| 2,314,858 A | * | 3/1943 | Forsberg | ............... 55/336 |
| 3,618,297 A | * | 11/1971 | Hamrick | ............... 96/406 |
| 3,621,641 A | | 11/1971 | Takei et al. | |
| 3,853,517 A | * | 12/1974 | Mitchell | ............... 55/288 |
| 4,198,726 A | | 4/1980 | Powell, Jr. | |
| 4,405,346 A | | 9/1983 | Tschudy et al. | |
| 4,573,237 A | | 3/1986 | Kochte et al. | |
| 5,061,305 A | * | 10/1991 | Karmel | ............... 55/429 |
| 5,171,340 A | * | 12/1992 | Karmel | ............... 55/429 |
| 5,199,963 A | | 4/1993 | Scarp | |
| 5,248,323 A | * | 9/1993 | Stevenson | ............... 95/90 |
| 5,259,854 A | | 11/1993 | Newman | |
| 5,659,922 A | | 8/1997 | Louis | |
| 5,829,090 A | | 11/1998 | Melito et al. | |
| 5,846,273 A | | 12/1998 | Dyson | |
| 5,961,677 A | * | 10/1999 | Scott | ............... 55/385.1 |
| 6,010,550 A | * | 1/2000 | Song | ............... 55/482 |
| 6,146,434 A | * | 11/2000 | Scalfani et al. | ............... 55/334 |
| 6,209,168 B1 | | 4/2001 | Brickner et al. | |
| 6,256,834 B1 | | 7/2001 | Meijer et al. | |
| 6,317,920 B1 | | 11/2001 | Brickner et al. | |

(Continued)

FOREIGN PATENT DOCUMENTS

JP          56-136642          10/1981

(Continued)

*Primary Examiner*—Duane Smith
*Assistant Examiner*—Minh-Chau T. Pham
(74) *Attorney, Agent, or Firm*—King & Schickli PLLC

(57) ABSTRACT

A vacuum cleaner includes a housing, a nozzle inlet, a suction generator and a dirt cup. The dirt cup includes a dirt collection chamber, an inlet and an open end. Additionally, the vacuum cleaner includes a filter assembly. The filter assembly includes a filter housing defining a filter chamber. The filter housing and chamber mate with the open end of the dirt cup. A filter element is held in the filter chamber on a ribbed support.

16 Claims, 3 Drawing Sheets

U.S. PATENT DOCUMENTS

| | | |
|---|---|---|
| 6,341,404 B1 | 1/2002 | Salo et al. |
| 6,358,290 B1 | 3/2002 | Huttlin |
| 6,401,295 B2 | 6/2002 | Bair et al. |
| 6,428,589 B1 | 8/2002 | Bair et al. |
| 6,436,160 B1 | 8/2002 | Stephens et al. |
| 6,463,622 B2 | 10/2002 | Wright et al. |
| 6,521,006 B2 * | 2/2003 | Park et al. .................. 55/337 |
| 6,596,044 B1 * | 7/2003 | Bilek et al. ................. 55/337 |
| 6,598,263 B2 * | 7/2003 | Boles et al. ................. 15/352 |
| 6,647,587 B1 * | 11/2003 | Ohara et al. ................ 15/350 |
| 6,818,032 B2 * | 11/2004 | Bilek et al. ................. 55/337 |
| 6,948,212 B2 * | 9/2005 | Oh et al. ..................... 15/328 |
| 6,949,130 B1 * | 9/2005 | Grey et al. .................. 55/305 |
| 6,949,134 B2 * | 9/2005 | Song ........................... 96/134 |
| 7,014,671 B2 * | 3/2006 | Oh ............................... 55/337 |
| 7,018,439 B2 * | 3/2006 | Vuijk .......................... 55/429 |
| 7,070,639 B2 * | 7/2006 | Inoue et al. ................. 55/429 |
| 7,105,034 B2 * | 9/2006 | Jung et al. .................. 55/337 |
| 7,105,035 B2 * | 9/2006 | Oh et al. ..................... 55/337 |
| 7,135,051 B2 * | 11/2006 | Baldinger et al. ........... 55/337 |
| 7,166,141 B2 * | 1/2007 | Skinner Macleod et al. .. 55/337 |
| 7,188,388 B2 * | 3/2007 | Best et al. ................... 15/329 |
| 7,267,704 B2 * | 9/2007 | Allgeier ...................... 55/429 |
| 2002/0026775 A1 | 3/2002 | Murphy et al. |
| 2002/0029436 A1 | 3/2002 | Hawkins et al. |
| 2002/0073663 A1 | 6/2002 | Sepke et al. |
| 2002/0095742 A1 | 7/2002 | Bair et al. |
| 2002/0129462 A1 | 9/2002 | Matusz et al. |

FOREIGN PATENT DOCUMENTS

JP   56-136650   10/1981

* cited by examiner

DISPOSABLE FILTER WITHIN A REMOVABLE CHAMBER

This application claims the benefit of U.S. Provisional Patent Application Ser. No. 60/424,424 filed on Nov. 7, 2002.

TECHNICAL FIELD

The present invention relates generally to the floor care equipment field and, more particularly, to a dirt collection assembly for an upright or canister vacuum cleaner.

BACKGROUND OF THE INVENTION

Bagless vacuum cleaner technology has long been known in the art. Japanese Patent Applications 56-136642 and 56-136650 both published in 1981 disclose an upright vacuum cleaner with a dust collection chamber that removably connects to an opening of the main unit to facilitate user convenience during the emptying of the cleaner. A removable filter fills an opening at the bottom of the dust chamber and serves to separate dust from air drawn through the vacuum cleaner by the fan and motor assembly.

The present invention relates to an improved dirt collection assembly for an upright or canister vacuum cleaner.

SUMMARY OF THE INVENTION

In accordance with the purposes of the present invention as described herein, an improved vacuum cleaner is provided. That vacuum cleaner includes a housing, a nozzle inlet, a suction generator carried on the housing and a dirt cup. The dirt cup includes a dirt collection chamber, an inlet and an open end.

Additionally, the vacuum cleaner includes a filter assembly. The filter assembly includes a filter housing defining a filter chamber. The filter housing and filter chamber mate with the open end of the dirt cup. A filter element is held in the filter chamber in the filter housing.

More specifically describing the invention, the filter housing includes a base, a sidewall and a top. The base includes an inlet opening in fluid communication with the open end of the dirt cup. At least one exhaust vent opening is provided in one of the sidewall and the top of the filter housing.

The filter assembly further includes a ribbed filter support. The ribbed filter support includes a concavity for receiving the filter element. The concavity is open towards the inlet opening in the base. The filter element is concave to match the concavity of the filter support. In one embodiment the filter element is formed from filter paper of appropriate porosity. The filter element has a surface area $A_1$ greater than a surface area $A_2$ of the inlet opening and greater than a surface area $A_3$ of the open end of the dirt cup. Additionally, a filter screen is held by the base across the inlet opening.

In one possible embodiment of the present invention, the dirt collection chamber is substantially cylindrical in shape. Further, the inlet is tangentially directed with respect to a sidewall of the dirt collection chamber. Accordingly, cyclonic airflow is established in the dirt collection chamber. Under certain operating conditions cyclonic airflow may enhance the cleaning performance of the vacuum cleaner.

In accordance with yet additional aspects of the present invention, the filter element may be frustoconical in shape. Further, the housing includes a nozzle section including the nozzle inlet and a canister section. The nozzle section and the canister section are pivotally connected together.

In the following description there is shown and described a preferred embodiment of the invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING FIGURES

The accompanying drawing incorporated in and forming a part of this specification, illustrates several aspects of the present invention, and together with the description serves to explain certain principles of the invention. In the drawing.

Reference will now be made in detail to the present preferred embodiment of the invention, an example of which is illustrated in the accompanying drawing.

DETAILED DESCRIPTION OF THE INVENTION

Figure 1:
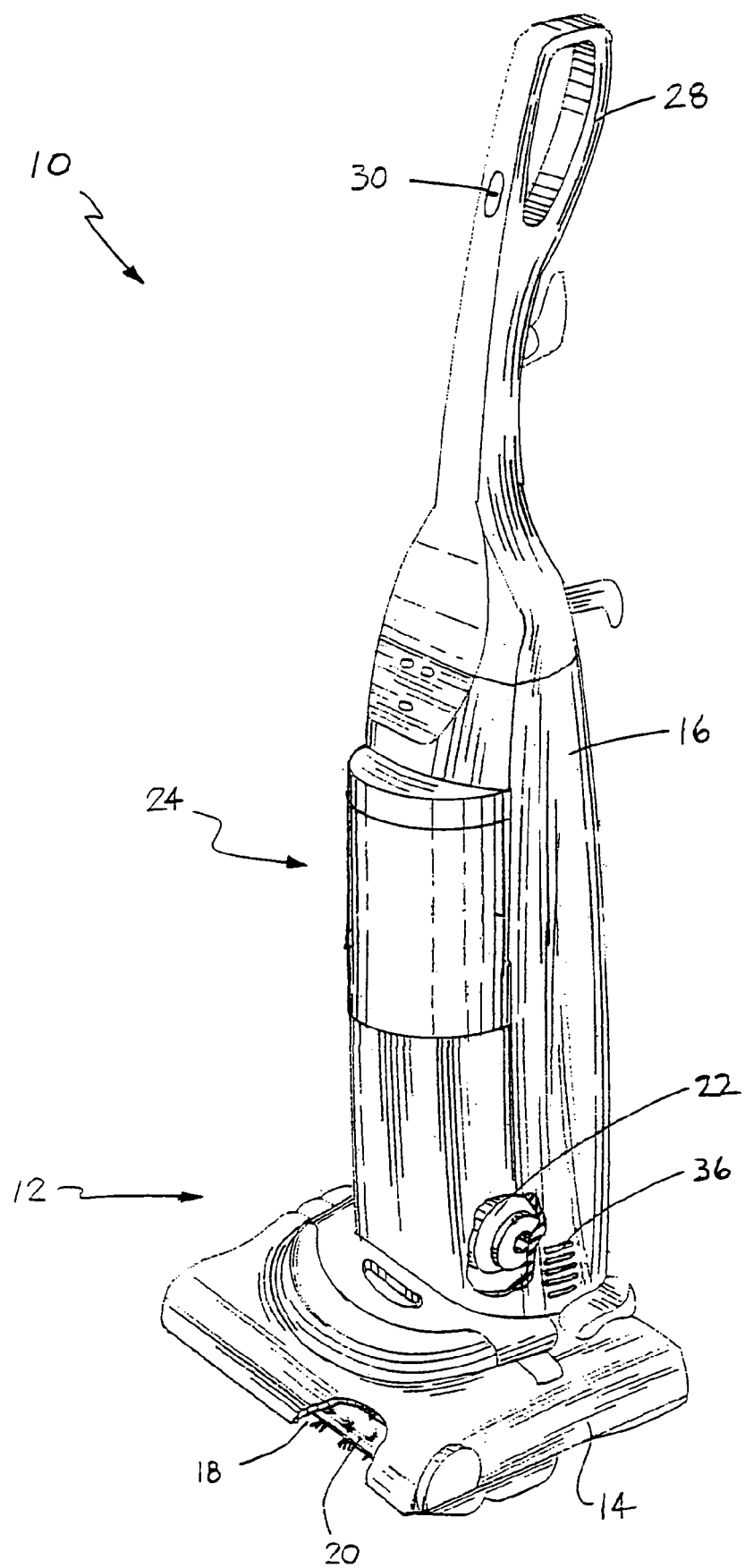
FIG. 1 is a perspective view of the vacuum cleaner of the present invention.

Reference is now made to FIG. 1 illustrating one possible embodiment of the vacuum cleaner 10 of the present invention. The illustrated embodiment is an upright vacuum cleaner 10. It should be appreciated, however, that the present invention also includes and this patent covers canister and hand-held, bagless vacuum cleaners.

The vacuum cleaner 10 includes a housing, generally designated by reference numeral 12, including a nozzle section 14 and a canister section 16. As is known in the art, the canister section 16 is pivotally connected to the nozzle section 14 to, among other purposes, aid the operator in manipulating the vacuum cleaner to and fro across the floor. Wheels (not shown) carried on the housing 12 allow the vacuum cleaner 10 to be moved smoothly across the floor.

As illustrated, the nozzle section 14 is equipped with a nozzle inlet 18. In the illustrated embodiment, the nozzle inlet 18 also includes a rotary agitator 20.

Figure 2:
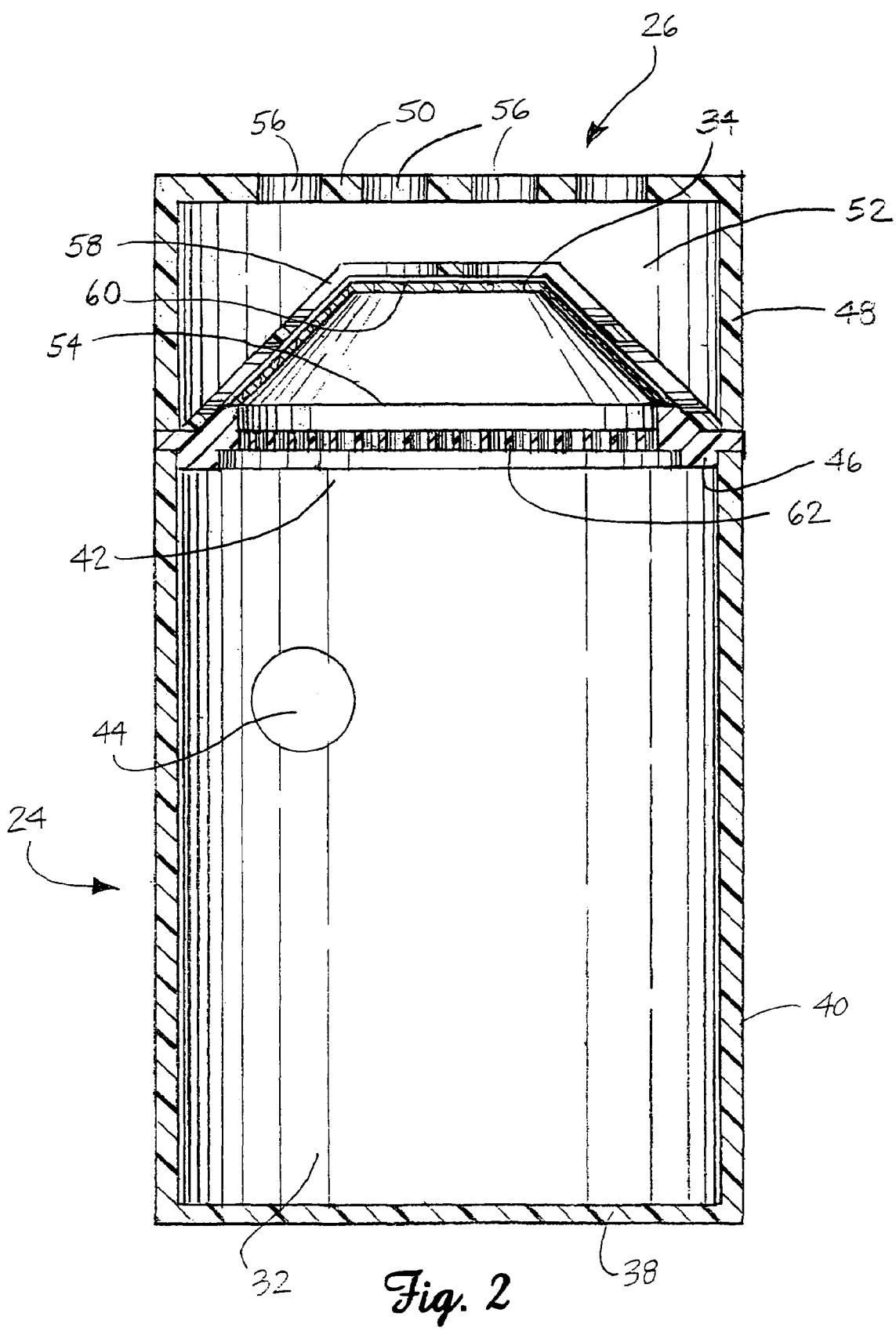
FIG. 2 is partially schematical and cross-sectional view of the dirt collection assembly of the present invention.

The canister section 16 houses a suction generator 22 (i.e. a fan and motor assembly), a dirt cup 24 and a filter assembly 26 (see also FIG. 2). The canister section 16 also includes a control handle 28 and an actuator switch 30 for turning the vacuum cleaner 10 on and off and thereby driving the rotary agitator 20 and the suction generator 22.

During the cleaning operation the rotary agitator 20 brushes and beats dirt and debris from the nap of an underlying carpet being cleaned. That dirt and debris is then drawn by the suction generator 22 through the nozzle inlet 18 into the dirt cup 24 where the majority of the dirt and debris and, more particularly, the relatively coarse dirt and debris is collected in a dirt collection chamber 32. Next, the relatively clean air is drawn through the filter assembly 26 where a filter element 34 cleans the air of substantially any remaining fine particles. The airstream is then directed over the motor of the suction generator 22 to provide cooling before being routed through a final filter, to remove any carbon particles stripped from the suction fan and motor by the airstream, before exhausting the airstream through an exhaust port 36 into the environment.

As illustrated in FIG. 2, the dirt cup 24 includes a bottom wall 38, a cylindrical sidewall 40 and an open end 42. In the illustrated embodiment an inlet 44 is provided in the sidewall 40. The inlet 44 may be tangentially directed with respect to the sidewall 40 of the dirt collection chamber 32 in order to induce cyclonic airflow in the dirt collection chamber 32. While not illustrated, it should be appreciated that the inlet 44 could also be provided in the bottom wall 38 if desired.

The filter assembly 26 includes a housing comprising a base 46, a sidewall 48 and a top wall 50. Together, the base 46, sidewall 48 and top wall 50 define a filter chamber 52.

In the illustrated embodiment the base 46 is annular and includes an inlet opening 54 in fluid communication with the open end 42 of the dirt cup 24. At least one exhaust vent 56 is provided in the top wall 50 or sidewall 48 of the filter housing.

Figure 3:
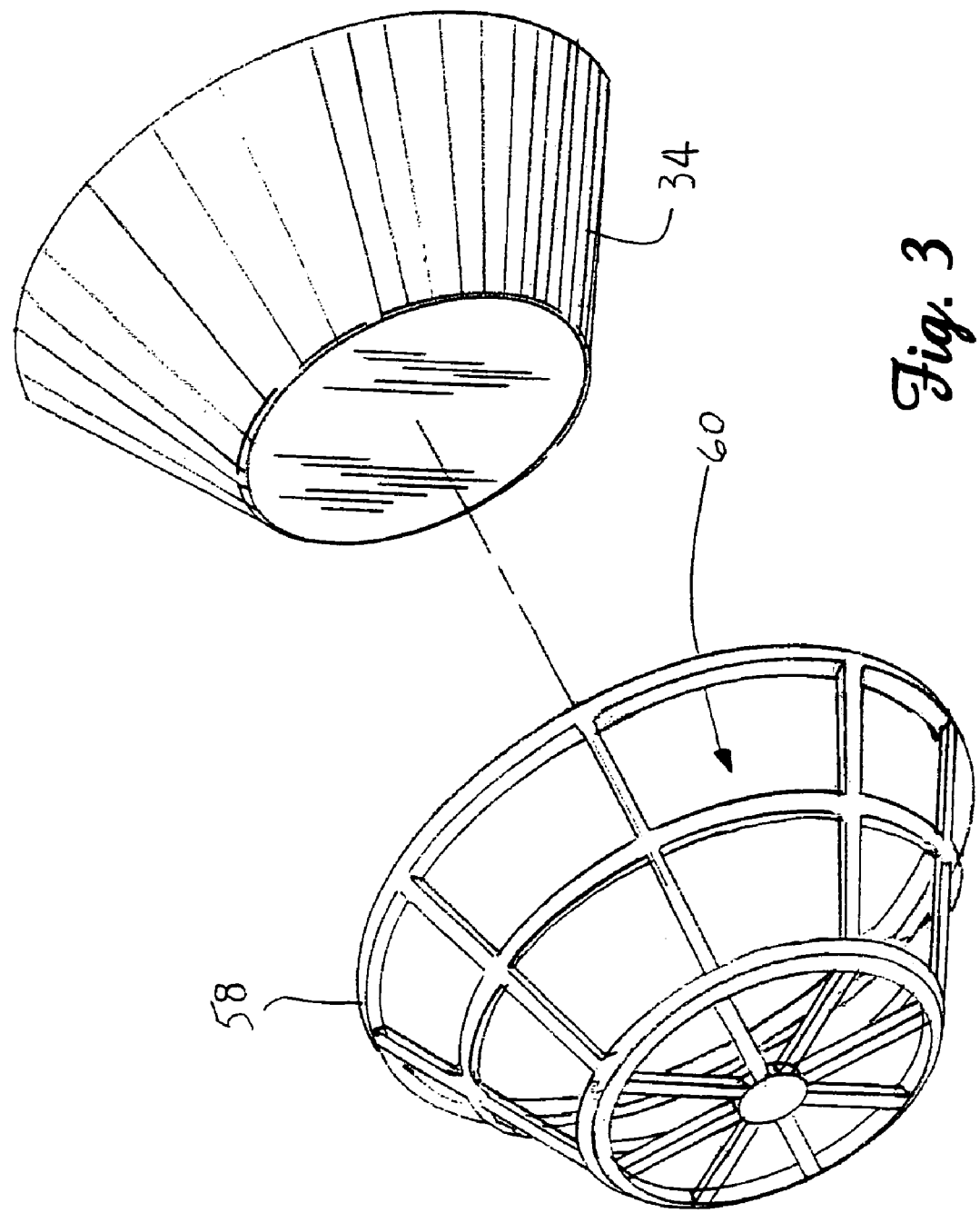
FIG. 3 is a detailed, exploded perspective view illustrating the ribbed filter support and the filter element received and held in that support.

As further illustrated in FIG. 2, the filter assembly 26 also includes a ribbed filter support 58. As best illustrated in FIG. 3, the ribbed filter support 58 includes a concavity 60. The filter element 34 is substantially frustoconical in shape and is concave to match the concavity 60 of the filter support 58. In one possible embodiment the filter element is formed from filter paper of appropriate porosity for use as a vacuum cleaner filter. Accordingly, the filter element 34 may be made from relatively inexpensive material and is therefore disposable.

As best illustrated in FIG. 2, the concavity 60 and, therefore, the concave surface of the filter element 34 opens toward the inlet opening 54 in the base 46. Accordingly, the filter element 34 has a relatively large surface area $A_1$ greater than the surface area $A_2$ of the inlet opening 54 and the surface area $A_3$ of the open end 42 of the dirt cup 24. This effectively enhances airflow through the filter element 34 thereby enhancing the cleaning efficiency of the vacuum cleaner.

In operation, the rotary agitator 20 brushes and beats dirt and debris from the nap of an underlying carpet being cleaned. That dirt and debris is then drawn by the suction generator 22 through the nozzle inlet 18 and is directed via one or more hoses and conduits (not shown) to the air inlet 44 through which it is delivered into the dirt collection chamber 32 of the dirt cup 24. A screen 62 provided across the inlet opening 54 in the base 46 captures relatively large dirt and debris in the dirt collection chamber 32. The airstream along with any fine particles of dirt and debris able to pass through the screen 62 then passes through the filter element 34. Fine particles of dirt and debris are captured by the disposable filter element 34 and relatively clean air passes through the ribbed filter support 58 and the exhaust vents 56 into the exhaust pathway 40. The now clean air is then drawn by the suction generator 22 over the motor of the suction generator to provide cooling. The air is then filtered one final time to remove any carbon that might have been picked up from the motor brushes before being exhausted into the environment through the exhaust port 36.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, the filter assembly 26 may seat on the dirt cup 24 and be removable from the housing 10 with the dirt cup. Alternatively, the dirt cup 24 may be separate from the filter assembly 26 and independently removable from the housing 10 for emptying. Further, while the illustrated embodiment takes advantage of the added cleaning efficiency provided by cyclonic airflow, the present invention is not limited to cyclonic airflow embodiments. Additionally, while the suction generator 22 in the illustrated embodiment is located downstream from the dirt cup 24 it could also be located upstream therefrom. Thus, it should be appreciated that the present invention may be utilized on "dirty air" vacuum cleaner systems.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

What is claimed is:

1. A vacuum cleaner, comprising:
   a housing;
   a nozzle inlet;
   a suction generator carried on said housing;
   a dirt cup carried on said housing, said dirt cup including a dirt collection chamber, an inlet and an open end;
   a filter assembly including a filter housing defining a filter chamber, said filter housing and filter chamber mating with said open end of said dirt cup; and
   a filter element held in said filter chamber in said filter housing.

2. The vacuum cleaner of claim 1 wherein said filter housing includes a base, a sidewall and a top.

3. The vacuum cleaner of claim 2 wherein said base includes an inlet opening in fluid communication with said open end of said dirt cup.

4. The vacuum cleaner of claim 3, wherein at least one exhaust vent opening is provided in one of said sidewall and said top of said filter housing.

5. The vacuum cleaner of claim 4, wherein said filter assembly further includes a ribbed filter support.

6. The vacuum cleaner of claim 5, wherein said ribbed filter support includes a concavity for receiving said filter element.

7. The vacuum cleaner of claim 6, wherein said concavity is open towards said inlet opening in said base.

8. The vacuum cleaner of claim 7, wherein said filter element is concave to match said concavity of said filter support.

9. The vacuum cleaner of claim 8, wherein said filter element is formed from filter paper.

10. The vacuum cleaner of claim 9, wherein said filter element has a surface area $A_1$ greater than a surface area $A_2$ of said inlet opening and greater than a surface area $A_3$ of said open end of said dirt cup.

11. The vacuum cleaner of claim 3, further including a filter screen held by said base across said inlet opening.

12. The vacuum cleaner of claim 1, wherein said dirt collection chamber is substantially cylindrical in shape.

13. The vacuum cleaner of claim 12, wherein said inlet is tangentially directed with respect to a sidewall of said dirt collection chamber.

14. The vacuum cleaner of claim 13, wherein said filter element is frustoconical in shape.

15. The vacuum cleaner of claim 14, wherein said housing includes a nozzle section including said nozzle inlet and a canister section.

16. The vacuum cleaner of claim 15, wherein said nozzle section and canister section are pivotally connected together.

* * * * *